United States Patent
Miyoshi et al.

(10) Patent No.: US 6,596,839 B2
(45) Date of Patent: Jul. 22, 2003

(54) WHOLLY AROMATIC POLYESTER AND PRODUCTION PROCESS THEREFOR

(75) Inventors: Takanori Miyoshi, Iwakuni (JP); Hiroshi Sakurai, Iwakuni (JP); Toyoaki Ishiwata, Iwakuni (JP); Shunichi Matsumura, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 10/169,671

(22) PCT Filed: Jan. 17, 2001

(86) PCT No.: PCT/JP01/00265

§ 371 (c)(1),
(2), (4) Date: Jul. 8, 2002

(87) PCT Pub. No.: WO01/53378

PCT Pub. Date: Jul. 26, 2001

(65) Prior Publication Data

US 2003/0027972 A1 Feb. 6, 2003

(30) Foreign Application Priority Data

Jan. 19, 2000 (JP) ........ 2000-010405
Jan. 26, 2000 (JP) ........ 2000-016862
Mar. 10, 2000 (JP) ........ 2000-066254
Jun. 20, 2000 (JP) ........ 2000-184331

(51) Int. Cl.$^7$ ............ C08G 63/00

(52) U.S. Cl. ........ 528/179; 528/180; 528/181; 528/190; 528/194; 528/204; 528/279; 528/283; 525/302; 525/308; 525/308.6; 524/714; 524/777; 524/783; 524/784

(58) Field of Search ........ 528/179, 180, 528/181, 190, 194, 204, 279, 283, 302, 308, 308.6; 524/714, 777, 783, 784

(56) References Cited

FOREIGN PATENT DOCUMENTS

JP 04-236224 8/1992
JP 07-133345 5/1995

*Primary Examiner*—Samuel A. Acquah
(74) *Attorney, Agent, or Firm*—Sughrue Mion, PLLC

(57) ABSTRACT

A process for producing a wholly aromatic polyester which is excellent in heat resistance, mechanical properties and yet color and has a high degree of polymerization by melt polymerizing a dicarboxylic acid and a diol directly on an industrial scale at a low cost in a short period of time without esterifying the dicarboxylic acid or diol in advance. To produce the wholly aromatic polyester by reacting and molding an aromatic dicarboxylic acid such as terephthalic acid, an aromatic diol such as 2,2-bis(4-hydroxyphenyl) propane and a diaryl carbonate by heating, a combination of a specific pyridine compound and an alkali metal (bi) carbonate, a combination of a specific pyridine compound and an organic tin compound or a specific titanium compound is existent as a catalyst. Thereby, the wholly aromatic polyester having the above properties is obtained.

25 Claims, 1 Drawing Sheet

WHOLLY AROMATIC POLYESTER AND PRODUCTION PROCESS THEREFOR

FIELD OF THE INVENTION

The present invention relates to a wholly aromatic polyester and to a production process therefor. More specifically, it relates to an amorphous wholly aromatic polyester which is excellent in heat resistance, toughness, mechanical properties and yet color and to a process for producing the same efficiently.

DESCRIPTION OF THE PRIOR ART

Higher properties have recently been required of engineering plastics which have high heat resistance and excellent mechanical strength. Amorphous engineering plastics include aromatic polyester carbonates and wholly aromatic polyesters derived from aromatic diols and aromatic dicarboxylic acids. For example, a wholly aromatic polyester which comprises 2,2-bis(4-hydroxyphenyl)propane (to be referred to as bisphenol A hereinafter) as an aromatic diol and terephthalic acid and isophthalic acid as aromatic dicarboxylic acids has relatively well balanced properties and is used for various purposes.

Studies have been made on processes for producing these amorphous wholly aromatic polyesters, out of which an interfacial polycondensation process between an acid halide of an aromatic dicarboxylic acid and an aromatic diol has already been industrialized. However, methylene chloride which is generally used as a reaction solvent in this interfacial polycondensation process is a chemical substance which has environmental and hygienic problems and whose handling needs much attention. Since its boiling point is very low at 40° C., it is difficult and costs dear to construct a closed system capable of completely recycling methylene chloride used in the production of an aromatic polyester.

The production of an aromatic polyester carbonate from an acid halide of an aromatic dicarboxylic acid, aromatic diol and phosgene by an interfacial polymerization process involves similar problems. Then, a melt polymerization process for these polymers is now under investigation.

However, when these polymers are to be directly obtained from an aromatic dicarboxylic acid and an aromatic diol by the melt polymerization process, coloring occurs markedly and the polymerization rate is low. Therefore, the process is not practical. In fact, there are known other processes such as (1) one in which a diaryl ester of a dicarboxylic acid and a diol are reacted with each other, (2) one in which a dicarboxylic acid and a lower aliphatic carboxylate of a diol are reacted with each other, and (3) one in which a lower aliphatic carboxylic anhydride is added when a dicarboxylic acid and a diol are reacted with each other as a modification of the process (2). However, the processes (1) and (2) involve such a problem that raw materials must be esterified in advance, thereby boosting costs. The processes (2) and (3) have such problems that the apparatuses are easily corroded by a lower aliphatic carboxylic acid formed during a reaction and that the obtained polymer has a large content of terminal COOH group.

As means of solving the above problems, there is a process in which an aromatic dicarboxylic acid, aromatic diol and diaryl carbonate are reacted with one another. Even with this process, it is difficult to obtain a polymer which is excellent in color. As means of improving color, JP-A 3-128926 (the term "JP-A" as used herein means an "unexamined published Japanese patent application") discloses a process for producing an aromatic polyester by reacting an aromatic dicarboxylic acid, aromatic diol and diaryl carbonate in the presence of a boron-tertiary amine complex compound and/or a quaternary ammonium borohydride compound as a catalyst. JP-A 4-236224 discloses a process for producing an aromatic polyester in the presence of a specific tin compound as a catalyst.

Generally speaking, aromatic dicarboxylic acids have low solubility and the dissolution of an aromatic dicarboxylic acid is rate-determined step in the polymerization reaction. Therefore, a reaction must be carried out at a high temperature and may take long, whereby there is limitation to the improvement of color. In the conventional melt polymerization process, a sublimate is formed during a polymerization reaction, thereby making the production process complicated due to the removal of the sublimate and equipment bulky with the result of a rise in costs.

To solve the above problems, some of the inventors of the present invention disclosed in JP-A 7-133345 that a wholly aromatic polyester which is excellent in color and contains an extremely small amount of a sublimate formed during a polymerization reaction can be produced by reacting an aromatic dicarboxylic acid, aromatic diol and diaryl carbonate in the presence of a specific pyridine compound.

However, a wholly aromatic polyester having a higher degree of polymerization is now in demand along with the improvement of required properties and a process for obtaining a wholly aromatic polyester having a high degree of polymerization in a short period of time is desired.

SUMMARY OF THE INVENTION

It is an object of the present invention to provide a process for producing a wholly aromatic polyester directly from a dicarboxylic acid and a diol by melt polymerization on an industrial scale at a low cost in a short period of time without esterifying the dicarboxylic acid or diol in advance.

It is another object of the present invention to provide a wholly aromatic polyester which is excellent in heat resistance, toughness, mechanical properties and color and has a high degree of polymerization.

Other objects and advantages of the present invention will become apparent from the following description.

Firstly, according to the present invention, the above objects and advantages of the present invention are attained by a process for producing a wholly aromatic polyester comprising melt polycondensing by heating an aromatic dicarboxylic acid represented by the following formula (I):

$$\text{HOOC}—A^1—\text{COOH} \quad \quad (I)$$

wherein $A^1$ is a substituted or unsubstituted divalent aromatic group having 6 to 20 carbon atoms, an aromatic diol represented by the following formula (II):

$$\text{HO}—A^2—X—A^3—\text{OH} \quad \quad (II)$$

wherein $A^2$ and $A^3$ are each independently a substituted or unsubstituted phenylene group, and X is a group represented by the following formula:

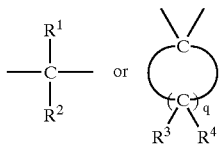

wherein $R^1$, $R^2$, $R^3$ and $R^4$ are each independently a hydrogen atom, halogen atom, alkyl group having 1 to 6 carbon atoms, cycloalkyl group having 5 to 6 carbon atoms, aryl group having 6 to 12 carbon atoms or aralkyl group having 7 to 12 carbon atoms, and q is an integer of 4 to 10, with the proviso that $R^3$'s and $R^4$'s may be the same or different, and a diaryl carbonate in the presence of at least one catalyst selected from the group consisting of (a) a combination of a pyridine compound represented by the following formula (III):

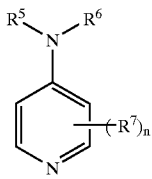

(III)

wherein $R^5$ and $R^6$ are each independently a hydrogen atom, alkyl group having 1 to 6 carbon atoms, cycloalkyl group having 5 to 10 carbon atoms, aryl group having 6 to 12 carbon atoms or aralkyl group having 7 to 12 carbon atoms, or $R^5$ and $R^6$ together with a nitrogen atom bonded thereto may be bonded together to form a 5- to 7-membered ring, $R^7$ is an alkyl group having 1 to 6 carbon atoms, cycloalkyl group having 5 to 10 carbon atoms, aryl group having 6 to 12 carbon atoms or aralkyl group having 7 to 12 carbon atoms, and n is an integer of 0 to 4, with the proviso that when n is an integer of 2 to 4, $R^7$'s may be the same or different, and an alkali metal carbonate or an alkali metal bicarbonate, (b) a combination of a pyridine compound represented by the above formula (III) and an organic tin compound represented by the following formula (IV):

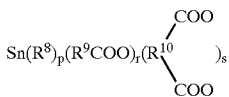

(IV)

wherein $R^8$ is an alkyl group having 1 to 20 carbon atoms, or unsubstituted or substituted aryl group having 6 to 20 carbon atoms, $R^9$ is an alkyl group having 1 to 20 carbon atoms, or unsubstituted or substituted aryl group having 6 to 20 carbon atoms, $R^{10}$ is a single bond, alkylene group having 1 to 10 carbon atoms, or unsubstituted or substituted arylene group having 6 to 20 carbon atoms, and p+r+2s=2 or 4, with the proviso that when p+r+2s=2, p=0 or 1, r=0,1 or 2 and s=0 or 1, and when p+r+2s=4, p is an integer of 0 to 3, r is an integer of 0 to 4 and s is an integer of 0 to 2, and (c) an organic titanium compound represented by the following formula (V):

 $Ti(OR^{11})_4$ (V)

wherein $R^{11}$ is an alkyl group having 1 to 6 carbon atoms, cycloalkyl group having 5 to 10 carbon atoms, aralkyl group having 7 to 12 carbon atoms or aryl group having 6 to 12 carbon atoms, with the proviso that $R^{11}$'s may be the same or different.

Secondly, according to the present invention, the above objects and advantages of the present invention are attained by a wholly aromatic polyester which contains a recurring unit represented by the following formula (A):

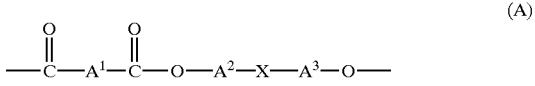

(A)

wherein $A^1$, $A^2$, $A^3$ and X are as defined hereinabove, and which has a haze value of 15 or less when it is molded into a 2 mm thick plate and an increase in haze value of 50 or less when this molded plate is immersed in water heated at 120° C. for 100 hours.

DETAILED DESCRIPTION OF THE PREFERRED EMBODIMENT

Figure 1:
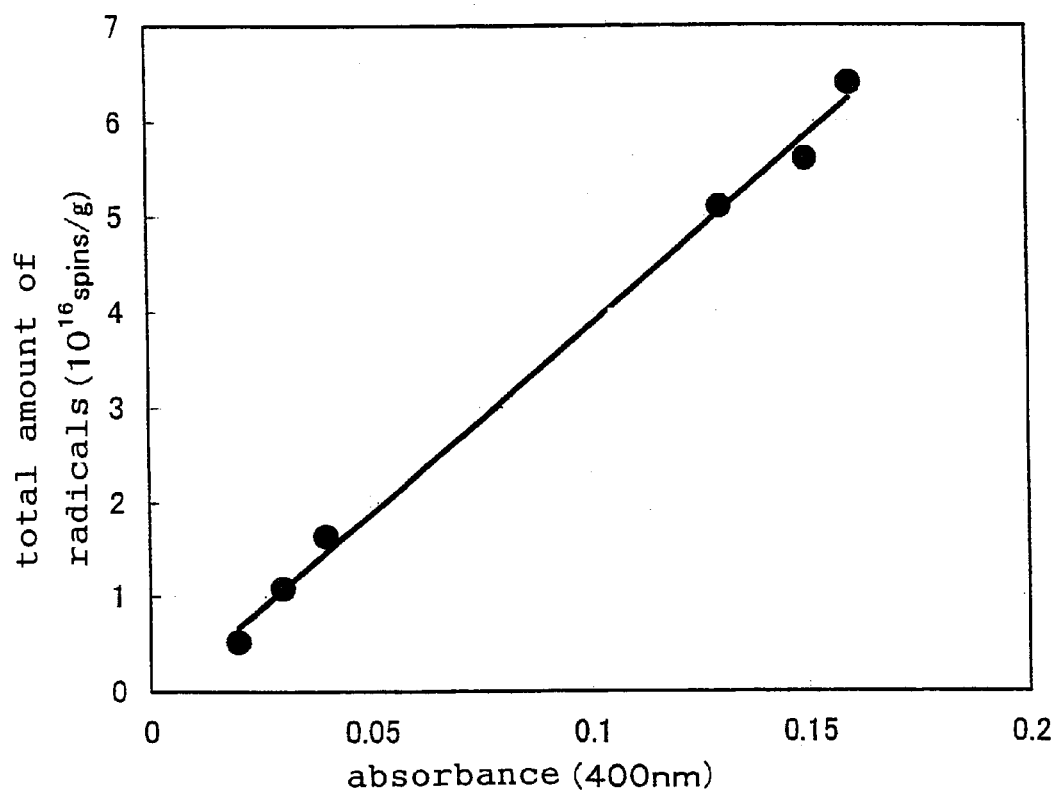
FIG. 1 shows the relationship between the amount of a radical having a g value of 0.0032±0.0001 after a heat treatment and the absorbance (400 nm) of a dichloromethane solution of a polymer.

A description is first given of the production process of the present invention.

The aromatic dicarboxylic acid used in the present invention is represented by the following formula (I).

 HOOC—$A^1$—COOH (I)

In the formula (I), $A^1$ is a substituted or unsubstituted divalent aromatic group having 6 to 20 carbon atoms. Examples of the unsubstituted aromatic group include p-phenylene, m-phenylene, 2,6-naphthylene, 2,7-naphthylene and biphenylene. $A^1$ may have at least one group selected from the group consisting of alkyl group, alkoxy group, aryl group, aryloxy group, aralkyl group and halogen atom in the aromatic group. Examples of the alkyl group include methyl, ethyl, propyl, butyl and hexyl. Examples of the alkoxy group include methoxy, ethoxy, propyloxy, butoxy and hexyloxy. Examples of the aryl group include phenyl, naphthyl and anthranyl. Examples of the aryloxy group include phenoxy and naphthyloxy. Examples of the aralkyl group include benzyl and phenethyl. Examples of the halogen atom include fluorine, chlorine and bromine. Examples of the aromatic dicarboxylic acid include terephthalic acid, isophthalic acid, methylterephthalic acid, methylisophthalic acid, naphthalene-2,6-dicarboxylic acid, naphthalene-2,7-dicarboxylic acid, diphenyldicarboxylic acid, diphenyl ether dicarboxylic acid, diphenylsulfonedicarboxylic acid, diphenylindanedicarboxylic acid and the like. These aromatic dicarboxylic acids may be used alone or in combination of two or more. A combination of terephthalic acid and isophthalic acid is particularly preferred.

The aromatic diol used in the present invention is represented by the following formula (II).

 HO—$A^2$—X—$A^3$—OH (II)

$A^2$ and $A^3$ in the above formula (II) are each independently a substituted or unsubstituted phenylene group. X is

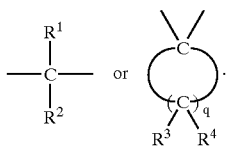

$R^1$, $R^2$, $R^3$ and $R^4$ are each independently a hydrogen atom, halogen atom, alkyl group having 1 to 6 carbon atoms, cycloalkyl group having 5 to 6 carbon atoms, aryl group having 6 to 12 carbon atoms or aralkyl group having 7 to 12 carbon atoms, and q is an integer of 4 to 10.

Examples of the halogen atom include fluorine, chlorine and bromine.

The alkyl group having 1 to 6 carbon atoms may be linear or branched, as exemplified by methyl, ethyl, n-propyl, iso-propyl, n-butyl, t-butyl, n-heptyl and n-hexyl.

Examples of the cycloalkyl group having 5 to 6 carbon atoms are cyclopentyl and cyclohexyl.

Examples of the aryl group having 6 to 12 carbon atoms include phenyl, naphthyl and biphenyl.

Examples of the aralkyl group having 7 to 12 carbon atoms include benzyl and phenethyl.

q is an integer of 4 to 10. $R^3$'s and $R^4$'s may be the same or different.

Examples of the aromatic diol include 2,2-bis(4-hydroxyphenyl)propane, 1,1-bis(4-hydroxyphenyl)-3,3,5-trimethylcyclohexane, 1,1-bis(4-hydroxyphenyl) cyclohexane, 2,2-bis(3-methyl-4-hydroxyphenyl)propane, 2,2-bis(3,5-dimethyl-4-hydroxyphenyl)propane and 2-(4-hydroxyphenyl)-2-(3,5-dichloro-4-hydroxyphenyl)propane. Out of these, 2,2-bis(4-hydroxyphenyl)propane, 1,1-bis(4-hydroxyphenyl)-3,3,5-trimethylcyclohexane and 2,2-bis(3-methyl-4-hydroxyphenyl)propane are preferred. These aromatic diols may be used alone or in combination of two or more.

Examples of the diaryl carbonate include diphenyl carbonate, di-p-tolyl carbonate, dinaphthyl carbonate, di-p-chlorophenyl carbonate and phenyl-p-tolyl carbonate. Out of these, diphenyl carbonate is particularly preferred. The diaryl carbonate may be substituted as is understood from the above examples. They may be used alone or in combination of two or more.

The process of the present invention is carried out by melt polycondensing by heating the above aromatic dicarboxylic acid, aromatic diol and diaryl carbonate in the presence of a catalyst.

As described above, the catalyst is (a) a combination of a pyridine compound represented by the above formula (III) and an alkali metal carbonate or an alkali metal bicarbonate, (b) a combination of a pyridine compound represented by the above formula (III) and an organic tin compound represented by the above formula (IV), or (c) an organic titanium compound represented by the above formula (V). These catalysts may be used alone or in combination of two or more.

The pyridine compound used in the catalysts (a) and (b) is represented by the above formula (III).

In the formula (III), $R^5$ and $R^6$ are each independently a hydrogen atom, alkyl group having 1 to 6 carbon atoms, cycloalkyl group having 5 to 10 carbon atoms, aryl group having 6 to 12 carbon atoms or aralkyl group having 7 to 12 carbon atoms, or $R^5$ and $R^6$ together with a nitrogen atom bonded thereto may be bonded together to form a 5- to 7-membered ring, $R^7$ is an alkyl group having 1 to 6 carbon atoms, cycloalkyl group having 5 to 10 carbon atoms, aryl group having 6 to 12 carbon atoms or aralkyl group having 7 to 12 carbon atoms, and n is an integer of 0 to 4.

Examples of the alkyl group having 1 to 6 carbon atoms, cycloalkyl group having 5 to 10 carbon atoms, aryl group having 6 to 12 carbon atoms and aralkyl group having 7 to 12 carbon atoms represented by $R^5$, $R^6$ and $R^7$ are the same as those enumerated for $R^1$ to $R^4$ in the above formula (II).

Examples of the 5- to 7-membered ring which can be formed by bonding $R^5$ and $R^6$ together include pyrrolidine ring, pyrroline ring and piperidine ring.

n is an integer of 0 to 4. When n is an integer of 2 to 4, $R^7$'s may be the same or different.

The pyridine compound is preferably a compound represented by the following formula (III)-1:

wherein $R^{51}$ and $R^{61}$ are each independently a hydrogen atom or alkyl group having 1 to 6 carbon atoms, or $R^{51}$ and $R^{61}$ together with a nitrogen atom bonded thereto may be bonded together to form a 5- to 7-membered ring.

Examples of the compound represented by the above formula (III) include 4-aminopyridine, 4-dimethylaminopyridine, 4-diethylaminopyridine, 4-pyrrolidinopyridine, 4-piperidinopyridine, 4-pyrrolinopyridine and 2-methyl-4-dimethylaminopyridine. Out of these, 4-dimethylaminopyridine and 4-pyrrolidinopyridine are particularly preferred.

The alkali metal of the alkali metal carbonate or alkali metal bicarbonate used together with the above pyridine compound is preferably lithium, sodium or potassium.

Examples of the alkali metal carbonate or bicarbonate used in the present invention include lithium carbonate, sodium carbonate, potassium carbonate, lithium bicarbonate, sodium bicarbonate and potassium bicarbonate. Out of these, potassium carbonate and potassium bicarbonate are the most preferred because their effects are large. By using the above pyridine compound and alkali metal carbonate or bicarbonate, especially potassium carbonate or bicarbonate, a markedly high polymerization rate which cannot be obtained with conventional ester exchange catalysts can be achieved.

The amount of the pyridine compound represented by the above formula (III) is not particularly limited but preferably 0.01 to 10 mol % based on the above aromatic dicarboxylic acid. When the amount is smaller than 0.01 mol %, the effect of the pyridine compound as a catalyst becomes unsatisfactory. When the amount is larger than 10 mol %, the physical properties of the obtained polymer may deteriorate disadvantageously. The amount is more preferably 0.05 to 1 mol %. The pyridine compound may be used in the form of an organic acid salt or inorganic acid salt.

The amount of the alkali metal carbonate or bicarbonate is not particularly limited but preferably 0.001 to 0.1 mol % based on the above aromatic diol. When the amount is smaller than 0.001 mol %, the effect of the alkali metal carbonate or bicarbonate as a catalyst becomes unsatisfactory. When the amount is larger than 0.1 mol %, the physical properties of the obtained polymer may deteriorate disadvantageously. The amount is more preferably 0.005 to 0.8 mol %.

The organic tin compound used in (b) above is represented by the above formula (IV).

In the formula (IV), $R^8$ is an alkyl group having 1 to 20 carbon atoms, or unsubstituted or substituted aryl group having 6 to 20 carbon atoms, $R^9$ is an alkyl group having 1 to 20 carbon atoms, or unsubstituted or substituted aryl group having 6 to 20 carbon atoms, $R^{10}$ is a single bond, alkylene group having 1 to 10 carbon atoms, or unsubstituted or substituted arylene group having 6 to 20 carbon atoms, and p+r+2s=2 or 4, with the proviso that when p+r+2s=2, p=0 or 1, r=0,1 or 2 and s=0 or 1, and when p+r+2s=4, p is an integer of 0 to 3, r is an integer of 0 to 4 and s=0 to 2.

The alkyl group having 1 to 20 carbon atoms represented by $R^8$ and $R^9$ may be linear or branched, as exemplified by methyl, ethyl, propyl, butyl, pentyl, hexyl, octyl, nonyl, decyl, hexadecyl and eicosanyl.

Examples of the unsubstituted or substituted aryl group having 6 to 20 carbon atoms represented by $R^8$ and $R^9$ include phenyl, naphthyl, methylphenyl, ethylphenyl, butylphenyl, hexylphenyl, chlorophenyl, 1-methylnaphthyl, 2-methylnaphthyl, 1-chloronaphthyl and 2-chloronaphthyl.

The alkylene group having 1 to 10 carbon atoms represented by $R^{10}$ may be linear or branched, as exemplified by methylene, ethylene, 1,2-propylene, trimethylene, hexamethylene, undecamethylene and decamethylene.

Examples of the unsubstituted or substituted arylene group having 6 to 20 carbon atoms represented by $R^{10}$ include o-phenylene, 3-methyl-o-phenylene, 4-methyl-o-phenylene, 4-ethyl-o-phenylene, 4-propyl-o-phenylene, 3,4-dimethyl-o-phenylene, 3-chloro-o-phenylene, 4-chloro-o-phenylene, 3,4-dichloro-o-phenylene, 1,8-naphthalene, 1,2-naphthalene and 2,3-naphthalene.

p+r+2s=2 or 4. When p+r+2s=2 (tin is divalent), p is 0 or 1, r is an integer of 0 to 2 and s is 0 or 1. When p+r+2s=4 (tin is tetravalent), p is an integer of 0 to 3, r is an integer of 0 to 4, and s is an integer of 0 to 2.

The organic tin compound is preferably a compound represented by the following formula (IV)-1:

$$Sn(R^8)_u(R^9COO)_w \qquad (IV)\text{-}1$$

wherein $R^8$ and $R^9$ are as defined hereinabove, and u+w=2 or 4, with the proviso that when u+w=2, u=0 or 1 and w=1 or 2, and when u+w=4, u is an integer of 0 to 3 and w is an integer of 1 to 4.

The organic tin compound is particularly preferably a compound of the formula (IV)-1 in which $R^8$ and $R^9$ are both alkyl groups having 1 to 20 carbon atoms independently.

Examples of the compound represented by the above formula (IV) include di-n-butyltin diacetate, di-n-butyltin dilaurate, di-octyltin dilaurate and tin 2-ethylhexanoate.

The pyridine compound represented by the above formula (III) used in the catalyst consisting of the combination (b) is preferably used in an amount as in the catalyst consisting of the combination (a).

The amount of the organic tin compound is not particularly limited but preferably 0.001 to 0.1 mol % based on the above aromatic diol. When the amount is smaller than 0.001 mol %, the effect of the organic tin compound as a catalyst becomes unsatisfactory. When the amount is larger than 0.1 mol %, the physical properties of the obtained polymer may deteriorate disadvantageously. The amount is more preferably 0.005 to 0.8 mol %.

The organic titanium compound used in the above catalyst (c) is represented by the above formula (V).

In the formula (V), $R^{11}$ is an alkyl group having 1 to 6 carbon atoms, cycloalkyl group having 5 to 10 carbon atoms, aralkyl group having 7 to 12 carbon atoms or aryl group having 6 to 12 carbon atoms. Examples of these groups are the same as those enumerated for $R^1$ to $R^4$ in the above formula (II).

In the formula (V), $R^{11}$'s may be the same or different.

The organic titanium compound is preferably a compound of the above formula (V) in which at least one of $R^{11}$'s is an aryl group.

Examples of the organic titanium compound represented by the above formula (V) include tetraphenoxy titanium, butoxytriphenoxy titanium, dibutoxydiphenoxy titanium, tetrabutoxy titanium, tetracresoxy titanium, ethoxytricresoxy titanium and diethoxydicresoxy titanium. Out of these, tetraphenoxy titanium and tetrabutoxy titanium are particularly preferred.

These titanium compounds have excellent catalytic activity and exhibit a satisfactory effect even when they are used alone. However, they may be used in combination of two or more as required.

The amount of the above organic titanium compound may be a so-called catalytic amount but preferably 0.000001 to 0.02 mol, more preferably 0.000005 to 0.0005 mol based on 1 mol of the aromatic dicarboxylic acid. Since this compound has excellent catalytic activity, it has an advantage that its amount is smaller than that of the above pyridine compound catalyst.

In the polycondensation reaction of the present invention, the diaryl carbonate mainly reacts with the dicarboxylic acid component and the diol component to form a phenol and carbonic acid gas in the initial stage. Generally speaking, the aromatic dicarboxylic acid has low solubility and a high melting point. Therefore, high temperature is needed to start the initial stage of the reaction and it takes long to complete the initial stage of the reaction. As a result, the obtained polymer is inferior in color and contains a large amount of a sublimate formed during the reaction in the conventional process. However, the initial stage of the reaction is started at an extremely low temperature in a short period of time when the above compounds are used. Therefore, it is presumed that the time required for the reaction becomes short and the color of the obtained polymer is greatly improved.

Particularly the organic titanium compound serves not only as an excellent catalyst in a reaction among an aromatic dicarboxylic acid, aromatic diol and diaryl carbonate but also as an ester exchange catalyst in the latter stage of the reaction, thereby making it possible to produce a wholly aromatic polyester of interest which has improved quality with an extremely small content of a sublimate formed during the reaction without using a conventionally known ester exchange catalyst.

In the process of the present invention, the aromatic dicarboxylic acid, aromatic diol and diaryl carbonate are preferably used in such amounts that satisfy the following expressions (1) and (2):

$$0.1 \leq A/B \leq 1.1 \qquad (1)$$

$$0.8 \leq (A+B)/C \leq 1.2 \qquad (2)$$

wherein A is the mols of the aromatic dicarboxylic acid, B is the mols of the aromatic diol and C is the mols of the diaryl carbonate.

Particularly when the following expressions (1)-1 and (2) are satisfied in such amounts that satisfy the above expressions, $$0.95 \leq A/B \leq 1.05 \qquad (1)\text{-}1$$

$$0.8 \leq (A+B)/C \leq 1.2 \qquad (2)$$

wherein A, B and C are as defined hereinabove, a wholly aromatic polyester which contains a carbonate bond in an amount of no more than about 5% based on the total of the carbonate bond and ester bond can be advantageously obtained.

Similarly, particularly when the following expressions (1)-2 and (2) are satisfied in such amounts that satisfy the above expressions:

$$0.1 \leq A/B < 0.95 \qquad (1)\text{-}2$$

$$0.8 \leq (A+B)/C \leq 1.2 \qquad (2)$$

wherein A, B and C are as defined hereinabove, a wholly aromatic polyester which contains a carbonate bond in an amount of about 5% or more based on the total of the carbonate bond and ester bond can be advantageously obtained.

The production process of the present invention is preferably a process for producing a wholly aromatic polyester having a reduced viscosity measured at a polymer solution concentration of 1.2 g/100 ml and 35° C. in a mixed solvent of phenol/1,1,2,2-tetrachloroethane (weight ratio of 60/40) of 0.5 dl/g or more. When the reduced viscosity of the wholly aromatic polyester is lower than 0.5 dl/g, the heat resistance and toughness of the obtained polymer become unsatisfactory. The upper limit of reduced viscosity is preferably approximately 2 for practical application.

In the reaction of the present invention, the final polymerization temperature for thermal polymerization is preferably 260 to 400° C. The final polymerization temperature herein means a temperature in the latter stage or at the end of polymerization. When the final polymerization temperature is lower than 260° C., the melt viscosity of the polymer becomes high, thereby making it impossible to obtain a polymer having a high degree of polymerization. When the final polymerization temperature is higher than 400° C., the deterioration of the polymer readily occurs disadvantageously.

Preferably, the polymerization temperature is initially set to a relatively low temperature and gradually raised to the above polymerization temperature in the end in the production process of the present invention. The initial polymerization temperature is preferably 160 to 320° C. The initial polymerization temperature is a temperature in the initial stage of polymerization. This initial polymerization reaction is carried out under normal pressure or reduced pressure. When the reaction is carried out under normal pressure, it is preferably carried out in an inert gas atmosphere such as nitrogen or argon. The polycondensation reaction time is not particularly limited but generally almost 1 to 10 hours.

In the process of the present invention, the above aromatic dicarboxylic acid, aromatic diol and diaryl carbonate are preferably charged into the same reactor at the same time from the beginning of the reaction but a molar equivalent of the diaryl carbonate may be divided into several parts and introduced into the reactor from the start of the reaction.

The production process of the present invention is more preferably a process for producing a wholly aromatic polyester by combining a method in which an aromatic dicarboxylic acid represented by the above formula (I), an aromatic diol represented by the above formula (II) and diaryl carbonate are used in such amounts that satisfy the above expressions (1)-1 and (2) and a method in which a pyridine compound represented by the above formula (III)-1 and a carbonate or bicarbonate of lithium, sodium or potassium are used as catalysts. It is much more preferably a process which further combines the above methods with a method in which a wholly aromatic polyester having a reduced viscosity of 0.5 dl/g or more can be obtained. It is the most preferably a process which still further combines the above methods with a method in which the polycondensation temperature is in the range of 260 to 400° C.

According to the present invention, there is provided a wholly aromatic polyester which contains a recurring unit represented by the following formula (A):

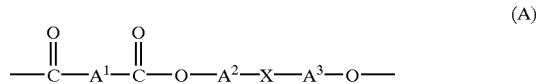

wherein $A^1$, $A^2$, $A^3$ and X are as defined hereinabove.

The wholly aromatic polyester is an amorphous polymer from which transparent moldings can be obtained by melt molding such as injection molding. The amorphous state of the wholly aromatic polyester can be confirmed from the fact that its melting point cannot be obtained by DSC.

The wholly aromatic polyester of the present invention has a haze value of 15 or less, preferably 10 or less when it is molded into a 2 mm thick plate and an increase in haze value of 50 or less, preferably 30 or less when the plate is immersed in water heated at 120° C. for 100 hours.

If the increase in haze value is larger than 50 when the plate is immersed in water heated at 120° C. for 100 hours, transparency will be lost when the plate is used for a long time at a location where it is exposed to steam.

The wholly aromatic polyester of the present invention includes (i) a polymer which contains a carbonate bond in an amount of no more than 5% based on the total of the carbonate bond and ester bond or which does not contain any carbonate bond or contains small amounts of carbonate bond, and (ii) a polymer which contains a carbonate bond in a relatively large amount, for example, about 5% or more based on the total of the carbonate bond and ester bond.

According to the present invention, there is further provided a wholly aromatic polyester which contains a recurring unit represented by the above formula (A) and a radical having a g value in the electronic spin resonance spectrum after 60 minutes of a heat treatment at 150° C. and 0.13 Pa of 2.0032±0.0001 in an amount of $5.0 \times 10^{16}$ spins/g or less.

The above wholly aromatic polyester contains at least one radical having a g value of 2.0031 to 2.0037 in the electronic spin resonance spectrum before the above heat treatment in an amount of $1.0 \times 10^{17}$ spins/g or less.

An amorphous wholly aromatic polyester produced by an interfacial polycondensation process which has already been industrialized has a radical in the skeleton of the polymer. However, this radical apparently differs from a radical in the skeleton of a polymer formed by the production process of the present invention in the g value of the radical. The present inventors have found that when the total amount of radicals contained in 1 g of the polymer is larger than $1.0 \times 10^{17}$ spins, the color of the polymer worsens considerably. To obtain a polymer which is excellent in color, the total amount of radicals contained in 1 g of the polymer is preferably reduced to $1.0 \times 10^{17}$ spins or less, more preferably $0.8 \times 10^{17}$ spins or less.

When the wholly aromatic polyester of the present invention is heated at 150° C. and 0.13 Pa, the total amount of radicals contained in the polymer gradually decreases. However, when the polyester is heated under the same conditions for 60 minutes, the total amount of radicals stops decreasing and does not change even when the polyester is heated for more than 60 minutes thereafter. A reduction in the total amount of radicals by the heat treatment, which differs according to the degree of coloring of the polymer and the type of the polymerization catalyst, is about 10 to 70% of the total amount of radicals before the heat treatment.

To obtain the wholly aromatic polyester of the present invention as a polymer which is excellent in color, the total amount of radicals contained in 1 g of the polymer after 60 minutes of a heat treatment at 150° C. and 0.13 Pa must be set to $5.0 \times 10^{16}$ spins or less, preferably $2.0 \times 10^{16}$ spins or less.

In order to reduce the total amount of radicals contained in the above wholly aromatic polyester, it is preferred to maintain the final polymerization temperature at 270° C. to 370° C. and the pressure at 200 Pa (1.5 mmHg) or less and set the retention time at the final polymerization temperature to 3 hours or less.

The present inventors have found the linear relationship between the total amount of radicals contained in the polymer after 60 minutes of a heat treatment at 150° C. and 0.13 Pa and the 400 nm absorbance of a solution containing 0.1 g of the polymer dissolved in 5 ml of dichloromethane. The relationship was shown in FIG. 1.

When the wholly aromatic polyester of the present invention is heated at 150° C. and 0.13 Pa for 60 minutes and then 0.1 g of the wholly aromatic polyester is dissolved in 5 ml of dichloromethane, the obtained solution shows an absorbance of preferably 0.1 or less, more preferably 0.05 or less at a wavelength of 400 nm.

The above wholly aromatic polyester containing a small total amount of radicals of the present invention includes the above polymers (i) and (ii).

The wholly aromatic polyester of the present invention has a reduced viscosity measured at 35° C. and 1.2 g/100 ml in a mixed solvent of phenol/1,1,2,2-tetrachloroethane (weight ratio of 60/40) of 0.5 dl/g or more. When the reduced viscosity is lower than 0.5 dl/g, the obtained polymer become unsatisfactory in terms of heat resistance and toughness. The upper limit of the reduced viscosity is preferably 2 for practical application.

The wholly aromatic polyester of the present invention is more preferably a wholly aromatic polyester which contains a recurring unit represented by the above formula (A), a radical having a g value after a heat treatment of 2.0032±0.0001 in an amount of $5.0 \times 10^{16}$ spins/g or less, and at least one radical having a g value before a heat treatment of 2.0032 to 2.0037 in an amount of $1.0 \times 10^{17}$ spins/g or less and shows an absorbance at a wavelength of 400 nm of a dichloromethane solution of the polymer after a heat treatment of 0.1 or less. It is more preferably a wholly aromatic polyester which has the above features and contains a carbonate bond in an amount of no more than 5% based on the total of the carbonate bond and ester bond.

Additives such as a stabilizer, colorant, pigment and lubricant may be added as required to the wholly aromatic polyester of the present invention at the time of production, for example.

The wholly aromatic polyester of the present invention has heat resistance and transparency and can be suitably used in moldings such as car light covers and electronic members.

EXAMPLES

The following examples are provided for the purpose of further illustrating the present invention but are in no way to be taken as limiting. In the examples, "parts" means "parts by weight". The reduced viscosity was measured at 35° C. and 1.2 g/100 ml in a mixed solvent of phenol/1,1,2,2-tetrachloroethane (weight ratio of 60/40). The glass transition temperature was measured by DSC (temperature elevation rate of 10° C./min). Molding was injection molding using the PS20 of Nissei Jushi Kogyo Co., Ltd. The haze of a molded product was measured using NDH-20D (Nihon Denshoku Kogyo Co.Ltd) in accordance with JIS K7105. The total amount of radicals contained in 1 g of the polymer was measured with an electronic spin resonance spectroscope (ESP300E of BRUKER) at room temperature using a benzene solution containing $1.0 \times 10^{-4}$ mol % of 1,1-diphenyl-2-picrylhydrazyl as a standard sample after the powder polymer was placed in a sample tube and the inside of the sample tube was heated. The g value of the radicals contained in the polymer was evaluated from a g value ($g_s$=2.034) of $Mn^{2+}$ diluted with MgO whose absorbance does not overlap with that of the measurement sample according to the following expression.

$$g = g_s + g_s \delta H / H_s$$

wherein $H_s$ is an absorption magnetic field at $g_s$=2.034 and $\delta H$ is a value obtained by subtracting the center absorbance magnetic field of the measurement sample from the $H_s$ value.

The 400 nm absorbance of a solution containing 0.1 g of the polymer dissolved in 5 ml of dichloroethane was measured with the UV-Vis spectroscope (UV-2400PC of Shimadzu Corporation) at room temperature.

Example 1

24.9 parts of terephthalic acid, 24.9 parts of isophthalic acid, 68.5 parts of 2,2-bis(4-hydroxyphenyl)propane, 128.5 parts of diphenyl carbonate, 0.037 part of 4-dimethylaminopyridine and 0.012 part of potassium carbonate were charged into a reactor having a vacuum distillation-out system equipped with a stirrer and nitrogen introduction port and the inside of the reactor was substituted by nitrogen to start a reaction at 200° C. After 30 minutes, the temperature was raised to 220° C. to continue the reaction at that temperature for 30 minutes. After the temperature was further raised to 240° C. and it was confirmed that phenol distilled out, the inside pressure of the system was gradually reduced. 4 hours after the start of the reaction, it was confirmed that the raw materials were uniformly dissolved. Thereafter, by further raising the temperature and further reducing the pressure, 6 hours after the start of the reaction, the inside of the system was set to a temperature of 320° C. and a pressure of about 66.7 Pa (about 0.5 mmHg). A polymerization reaction was carried out under the same conditions about 30 minutes to obtain a polymer. The obtained polymer was light yellow and had excellent transparency and a reduced viscosity of 0.67 dl/g.

Example 2

The procedure of Example 1 was repeated except that the amount of terephthalic acid was changed to 34.9 parts and the amount of isophthalic acid was changed to 15.0 parts. The obtained polymer was light yellow and transparent and had a reduced viscosity of 0.75 dl/g.

Example 3

The procedure of Example 1 was repeated except that the amount of terephthalic acid was changed to 37.4 parts and the amount of isophthalic acid was changed to 12.5 parts. The obtained polymer was light yellow and transparent and had a reduced viscosity of 0.64 dl/g.

Example 4

83.1 parts of terephthalic acid, 46.6 parts of 1,1-bis(4-hydroxyphenyl)-3,3,5-trimethylcyclohexane, 79.9 parts of 2,2-bis(4-hydroxyphenyl)propane, 214.2 parts of diphenyl carbonate, 0.061 part of 4-dimethylaminopyridine and 0.021 part of potassium carbonate were charged into a reactor having a vacuum distillation-out system equipped with a stirrer and nitrogen introduction port and the inside of the reactor was substituted by nitrogen to start a reaction at 200° C. under normal pressure. After 30 minutes, the temperature was raised to 220° C. while the normal pressure was maintained, it was confirmed that phenol distilled out at that temperature, and the inside pressure of the system was gradually reduced. 3 hours after the start of the reaction, it was confirmed that the raw materials were uniformly dissolved. Thereafter, by further raising the temperature and further reducing the pressure, 5 hours after the start of the reaction, the inside of the system was set to a final polymerization temperature of 340° C. and a vacuum degree of about 66.7 Pa (about 0.5 mmHg). Polymerization was carried out under the same conditions for 30 minutes to obtain a polymer. At this point, a sublimate was rarely formed. The obtained polymer was light yellow and transparent and had a reduced viscosity of 0.65 dl/g and a glass transition temperature of 233° C.

Example 5

The procedure of Example 4 was repeated except that the amount of 1,1-bis(4-hydroxyphenyl)-3,3,5-trimethylcyclohexane was changed to 31.0 parts and the amount of 2,2-bis(4-hydroxyphenyl)propane was changed to 91.3 parts. The obtained polymer was light yellow and transparent and had a reduced viscosity of 0.62 dl/g and a glass transition temperature of 223° C.

Example 6

The procedure of Example 4 was repeated except that the amount of 1,1-bis(4-hydroxyphenyl)-3,3,5-trimethylcyclohexane was changed to 15.5 parts and the amount of 2,2-bis(4-hydroxyphenyl)propane was changed to 102.7 parts. The obtained polymer was light yellow and transparent and had a reduced viscosity of 0.68 dl/g and a glass transition temperature of 217° C.

Example 7

41.5 parts of terephthalic acid, 41.5 parts of isophthalic acid, 46.6 parts of 1,1-bis(4-hydroxyphenyl)-3,3,5-trimethylcyclohexane, 79.9 parts of 2,2-bis(4-hydroxyphenyl)propane, 214.2 parts of diphenyl carbonate, 0.061 part of 4-dimethylaminopyridine and 0.021 part of potassium carbonate were charged into a reactor having a vacuum distillation-out system equipped with a stirrer and nitrogen introduction port and the inside of the reactor was substituted by nitrogen to start a reaction at 200° C. under normal pressure. After 30 minutes, the temperature was raised to 220° C. while the normal pressure was maintained, it was confirmed that phenol distilled out at that temperature, and the inside pressure of the system was gradually reduced. 3 hours after the start of the reaction, it was confirmed that the raw materials were uniformly dissolved. Thereafter, by further raising the temperature and further reducing the pressure, 5 hours after the start of the reaction, the inside of the system was set to a final polymerization temperature of 340° C. and a vacuum degree of about 66.7 Pa (about 0.5 mmHg). Polymerization was carried out under the same conditions for 30 minutes to obtain a polymer. At this point, a sublimate was rarely formed. The obtained polymer was light yellow and transparent and had a reduced viscosity of 0.51 dl/g and a glass transition temperature of 209° C.

Example 8

The procedure of Example 7 was repeated except that the amount of 1,1-bis(4-hydroxyphenyl)-3,3,5-trimethylcyclohexane was changed to 31.0 parts and the amount of 2,2-bis(4-hydroxyphenyl)propane was changed to 91.3 parts. The obtained polymer was light yellow and transparent and had a reduced viscosity of 0.65 dl/g and a glass transition temperature of 208° C.

Example 9

The procedure of Example 7 was repeated except that the amount of 1,1-bis(4-hydroxyphenyl)-3,3,5-trimethylcyclohexane was changed to 15.5 parts and the amount of 2,2-bis(4-hydroxyphenyl)propane was changed to 102.7 parts. The obtained polymer was light yellow and transparent and had a reduced viscosity of 0.77 dl/g and a glass transition temperature of 203° C.

Example 10

83.1 parts of terephthalic acid, 228.3 parts of 2,2-bis(4-hydroxyphenyl)propane, 353.4 parts of diphenyl carbonate, 0.244 part of 4-dimethylaminopyridine and 4.15 parts of potassium carbonate were charged into a reactor having a vacuum distillation-out system equipped with a stirrer and nitrogen introduction port and the inside of the reactor was substituted by nitrogen to start a reaction at 200° C. After 30 minutes, the temperature was raised to 220° C., it was confirmed after 30 minutes that phenol distilled out at that temperature, and then the inside pressure of the system was gradually reduced. 2 hours after the start of the reaction, it was confirmed that the raw materials were uniformly dissolved when the inside pressure of the system was set to 53.3 kPa (400 mmHg). Thereafter, by further raising the temperature and further reducing the pressure, the inside of the system was set to a temperature of 300° C. and a pressure of about 66.7 Pa (about 0.5 mmHg). Polymerization was carried out under the same conditions for 30 minutes to obtain a polymer. The obtained polymer was light yellow and transparent and had a reduced viscosity of 0.68 dl/g.

Example 11

The procedure of Example 1 was repeated except that a reaction was carried out for 90 minutes using 0.021 part of lithium carbonate in place of potassium carbonate by setting the inside of the system to a temperature of 320° C. and a pressure of about 66.7 Pa (about 0.5 mmHg) 6 hours after the start of the reaction. The obtained polymer was light yellow and transparent and had a reduced viscosity of 0.61 dl/g.

Example 12

The procedure of Example 1 was repeated except that a reaction was carried out for 60 minutes using 0.01 part of sodium carbonate in place of potassium carbonate by setting the inside of the system to a temperature of 320° C. and a pressure of about 66.7 Pa (about 0.5 mmHg) 6 hours after the start of the reaction. The obtained polymer was light yellow and transparent and had a reduced viscosity of 0.61 dl/g.

Example 13

The procedure of Example 1 was repeated except that 0.04 part of 4-pyrrolidinopyridine was used in place of 4-dimethylaminopyridine. The obtained polymer was light yellow and transparent and had a reduced viscosity of 0.63 dl/g.

Example 14

The procedure of Example 1 was repeated except that a reaction was carried out for 60 minutes using 0.04 part of di-n-butyltin diacetate in place of potassium carbonate by setting the inside of the system to a temperature of 320° C. and a pressure of about 66.7 Pa (about 0.5 mmHg) 6 hours after the start of the reaction. The obtained polymer was light yellow and transparent and had a reduced viscosity of 0.50 dl/g.

Example 15

33.2 parts of terephthalic acid, 33.2 parts of isophthalic acid, 91.2 parts of 2,2-bis(4-hydroxyphenyl)propane, 171.2 parts of diphenyl carbonate and 0.017 part of tetraphenoxy titanium were charged into a reactor having a vacuum distillation-out system equipped with a stirrer and nitrogen introduction port and the inside of the reactor was substituted by nitrogen to start a reaction at 200° C. After 30 minutes, the temperature was raised to 220° C., it was confirmed that phenol distilled out at that temperature, and the inside pressure of the system was gradually reduced. 2 hours after the start of the reaction, it was confirmed that the raw materials were uniformly dissolved. Thereafter, by further raising the temperature and further reducing the pressure, 3 hours after the start of the reaction, the inside of the system was set to a temperature of 320° C. and a pressure of about 66.7 Pa (about 0.5 mmHg). Polymerization was carried out under the same conditions for 1 hour to obtain an amorphous polyarylate. At this point, a sublimate was rarely formed. The obtained polymer was light yellow and transparent and had a reduced viscosity of 0.64 dl/g and a glass transition temperature of 191° C.

Example 16

66.4 parts of terephthalic acid, 182.4 parts of 2,2-bis(4-hydroxyphenyl)propane, 256.8 parts of diphenyl carbonate and 0.017 part of tetraphenoxy titanium were charged into a reactor having a vacuum distillation-out system equipped with a stirrer and nitrogen introduction port and the inside of the reactor was substituted by nitrogen to start a reaction at 170° C. Thereafter, the temperature was gradually raised to 250° C. and the pressure was gradually reduced to about 66.7 Pa (about 0.5 mmHg) over 5 hours. Thereafter, by further raising the temperature, the inside of the system was set to a temperature of 320° C. and a pressure of about 66.7 Pa (about 0.5 mmHg). Polymerization was carried out under the same conditions for 1 hour to obtain an amorphous polyarylate. The obtained polymer was light yellow and transparent and had a reduced viscosity of 0.63 dl/g and a glass transition temperature of 184° C.

Example 17

The procedure of Example 15 was repeated except that 0.041 part of tetrabutoxy titanium was used in place of tetraphenoxy titanium. The obtained polymer was light brown and transparent and had a reduced viscosity of 0.64 dl/g and a glass transition temperature of 191° C.

Comparative Example 1

The procedure of Example 1 was repeated except that potassium carbonate was not used, the inside of the system was set to a temperature of 320° C. and a pressure of about 66.7 Pa (about 0.5 mmHg) 6 hours after the start of the reaction, and the reaction was carried out under the same conditions for 90 minutes. The obtained polymer was light yellow and transparent and had a reduced viscosity of 0.21 dl/g. Therefore, a polymer having a sufficient degree of polymerization was not obtained.

Comparative Example 2

The procedure of Example 1 was repeated except that 0.01 part of potassium chloride was used in place of potassium carbonate, the inside of the system was set to a temperature of 320° C. and a pressure of about 66.7 Pa (about 0.5 mmHg) 6 hours after the start of the reaction, and the reaction was carried out under the same conditions for 90 minutes. The obtained polymer was yellow and unsatisfactory in terms of transparency and had a reduced viscosity of 0.37 dl/g.

Comparative Example 3

The procedure of Example 1 was repeated except that 0.07 part of calcium hydroxide was used in place of potassium carbonate, the inside of the system was set to a temperature of 320° C. and a pressure of about 66.7 Pa (about 0.5 mmHg) 6 hours after the start of the reaction, and the reaction was carried out under the same conditions for 90 minutes. The obtained polymer was yellow and unsatisfactory in terms of transparency and had a reduced viscosity of 0.16 dl/g.

Comparative Example 4

The procedure of Example 1 was repeated except that 0.02 part of germanium oxide was used in place of potassium carbonate, the inside of the system was set to a temperature of 320° C. and a pressure of about 66.7 Pa (about 0.5 mmHg) 6 hours after the start of the reaction, and the reaction was carried out under the same conditions for 90 minutes. The obtained polymer was yellow and unsatisfactory in terms of transparency and had a reduced viscosity of 0.19 dl/g.

Comparative Example 5

The procedure of Example 1 was repeated except that 0.026 part of antimony trioxide was used in place of potassium carbonate, the inside of the system was set to a temperature of 320° C. and a pressure of about 66.7 Pa (about 0.5 mmHg) 6 hours after the start of the reaction, and the reaction was carried out under the same conditions for 90 minutes. The obtained polymer was light yellow and transparent and had a reduced viscosity of 0.49 dl/g.

Example 18

498.4 parts of terephthalic acid, 498.4 parts of isophthalic acid, 1,370 parts of 2,2-bis(4-hydroxyphenyl)propane, 2,571 parts of diphenyl carbonate, 1.466 parts of 4-dimethylaminopyridine and 0.7 part of di-n-butyltin diacetate were charged into a reactor having a vacuum distillation-out system equipped with a stirrer and nitrogen introduction port and the inside of the reactor was substituted by nitrogen to start a reaction at 180° C. and 40.0 kPa (300 mmHg). After 90 minutes, the temperature was gradually raised and the pressure was gradually reduced, and 3 hours after the start of the reaction, the temperature became 220° C. and the pressure became 26.7 kPa (200 mmHg). The reaction was carried out at that temperature for 1 hour and the pressure was further reduced to 13.3 kPa (100 mmHg). Thereafter, the pressure was still further reduced to about 100 Pa (about 0.75 mmHg) and then the temperature was further raised to 310° C. 10 hours after the start of the reaction, a polymer was obtained. The obtained polymer was light yellow and transparent and had a reduced viscosity of 0.68 dl/g.

The obtained polymer was injection molded at 340° C. to fabricate a 2 mm thick plate (mold temperature of 120° C.). The initial haze of the obtained molded plate and the haze of the molded plate after it was immersed in water heated at 120° C. in an autoclave are shown in Table 1.

Example 19

The procedure of Example 18 was repeated except that the amount of terephthalic acid was changed to 697.7 parts and the amount of isophthalic acid was changed to 299 parts. The obtained polymer was light yellow and transparent and had a reduced viscosity of 0.83 dl/g.

The polymer was molded in the same manner as in Example 18 to measure a change in haze. The results are shown in Table 1.

Example 20

The procedure of Example 18 was repeated except that a polymer was obtained using 0.25 part of potassium carbonate in place of di-n-butyltin diacetate 6 hours after the start of the reaction. The obtained polymer was light yellow and transparent and had a reduced viscosity of 0.80 dl/g.

The polymer was molded in the same manner as in Example 18 to measure a change in haze. The results are shown in Table 1.

Example 21

697.8 parts of terephtalic acid, 299.0 parts of isophtalic acid, 1507 parts of 2,2-bis(4-hydroxyphenyl)propane, 2700 parts of diphenylcarbonate, 1.466 parts of 4-dimethylaminopyridine, 0.24 parts of potassium carbonate were charged into a reactor having a vacuum distillation-out system equipped with a stirrer and nitrogen introduction port and the inside of the reactor was substituted by nitrogen to start a rection at 180° C. and 40.0 KPa (300 mmHg). After 90 minutes, the temperature was gradually raised and the pressure was gradually reduced, and 3 hours after the start of the reaction, the temperature became 220° C. and the pressure became 26.7 KPa (200 mmHg). The reaction carried out at that temperature for 1 hour and the pressure was further reduced to 13.3 KPa (100 mmHg). Thereafter, the pressure was still further reduced to about 100 Pa (about 0.75 mmHg) and then temperature was further raised to 320° C. 10 hours after the reaction, a polymer was obtained. The obtained polymer was light yellow and transparent had a reduced viscosity of 0.69 dl/g and a glass transition temperature of 190° C.

The polymer was molded in the same manner as in Example 18 to measure a change in haze. The results are shown in Table 1.

Comparative Example 6

U polymer (U-100 of Unitika, Ltd.) which is a commercially available wholly aromatic polyester was injection molded at 340° C. to fabricate a 2 mm thick molded plate (mold temperature of 120° C.). The initial haze of the obtained molded plate and the haze of the molded plate after it was immersed in water heated at 120° C. in an autoclave are shown in Table 1.

Comparative Example 7

498.4 parts of terephthalic acid, 498.4 parts of isophthalic acid, 1,370 parts of 2,2-bis(4-hydroxyphenyl)propane, 2,571 parts of diphenyl carbonate and 0.25 part of potassium carbonate were charged into a reactor having a vacuum distillation-out system equipped with a stirrer and nitrogen introduction port the inside of the reactor was substituted by nitrogen to start a reaction at 180° C. under normal pressure. After 90 minutes, the temperature was gradually raised, and 4 hours after the start of the reaction, the temperature became 260° C. After the reaction was carried out at that temperature for 2 hours, the temperature was further raised to 310° C. Thereafter, the pressure was reduced to 100 Pa (0.75 mmHg), and 10 hours after the start of the reaction, a polymer was obtained. It was confirmed that a sublimate was formed during the reaction. The obtained polymer was brown and transparent and had a reduced viscosity of 0.70 dl/g.

The obtained polymer was molded in the same manner as in Comparative Example 6 to measure a change in haze. The results are shown in Table 1.

TABLE 1

|  | immersion time and haze | | | an increase in haze according to immersion time |
|---|---|---|---|---|
|  | (1) 0 hr | (2) 24 hr | (3) 100 hr | (3) − (1) |
| Ex. 18 | 4 | 4 | 6 | 2 |
| Ex. 19 | 4 | 4 | 7 | 3 |
| Ex. 20 | 3 | 7 | 20 | 17 |
| Ex. 21 | 3 | 6 | 6 | 3 |
| C. Ex. 6 | 4 | 33 | 82 | 78 |
| C. Ex. 7 | 6 | 42 | 85 | 79 |

Ex.: Example   C. Ex.: Comparative Example

Example 22

33.2 parts of terephthalic acid, 33.2 parts of isophthalic acid, 91.2 parts of 2,2-bis(4-hydroxyphenyl)propane, 171.2 parts of diphenyl carbonate, 0.049 part of 4-dimethylaminopyridine, 0.015 part of potassium carbonate and 0.0005 part of germanium oxide were charged into a reactor having a vacuum distillation-out system equipped with a stirrer and nitrogen introduction port the inside of the reactor was substituted by nitrogen to start a reaction at 200° C. After 30 minutes, the temperature was raised to 220° C., it was confirmed that phenol distilled out at that temperature, and the inside pressure of the system was gradually reduced. 3 hours after the start of the reaction, it was confirmed that the raw materials were uniformly dissolved. Thereafter, by further raising the temperature and further reducing the pressure, 5 hours after the start of the reaction, the inside of the system was set to a final polymerization temperature of 300° C. and a pressure of about 66.7 Pa (about 0.5 mmHg). Polymerization was carried out under the same conditions for 1 hour to obtain an amorphous wholly aromatic polyester. A sublimate was rarely formed during this time. The obtained polymer was light yellow and transparent and had a reduced viscosity of 0.64 dl/g, a glass transition temperature of 191° C., a total radical amount of $1.2 \times 10^{16}$ spins/g and a g value of 2.0037. The total amount of radicals contained in the polymer after 1 hour of a heat treatment at 150° C. and 0.13 Pa was $0.52 \times 10^{16}$ spins/g, the g value of the radicals was 2.0032, and the 400 nm absorbance of a solution containing 0.1 g of the polymer after the heat treatment dissolved in 5 ml of dichloromethane was 0.02.

Example 23

The procedure of Example 22 was repeated except that polymerization was carried out using 0.013 part of di-n-butyltin diacetate in place of potassium carbonate at a final polymerization temperature of 320° C. and a pressure of about 66.7 Pa (about 0.5 mmHg) for 1 hour. The obtained polymer was light yellow and transparent and had a reduced viscosity of 0.61 dl/g, a glass transition temperature of 190° C., a total radical amount of $1.6 \times 10^{16}$ spins/g and a g value of 2.0037. The total amount of radicals contained in the polymer after 1 hour of a heat treatment at 150° C. and 0.13 Pa was $1.08 \times 10^{16}$ spins/g, the g value of the radicals was 2.0032, and the 400 nm absorbance of a solution containing 0.1 g of the polymer after the heat treatment dissolved in 5 ml of dichloromethane was 0.03.

Example 24

The procedure of Example 22 was repeated except that polymerization was carried out using 0.013 part of di-n-butyltin diacetate in place of potassium carbonate at a final polymerization temperature of 320° C. and a pressure of about 66.7 Pa (about 0.5 mmHg) for 2 hours. The obtained polymer was light yellow and transparent and had a reduced viscosity of 0.72 dl/g, a glass transition temperature of 193° C., a total radical amount of $3.9 \times 10^{16}$ spins/g and a g value of 2.0037. The total amount of radicals contained in the polymer after 1 hour of a heat treatment at 150° C. and 0.13 Pa was $1.63 \times 10^{16}$ spins/g, the g value of the radicals was 2.0032, and the 400 nm absorbance of a solution containing 0.1 g of the polymer after the heat treatment dissolved in 5 ml of dichloromethane was 0.04.

Example 25

The polymer obtained Example 22 had a total radical amount of $1.0 \times 10^{16}$ spins/g and a g value at 2.0037. The total amount of radicals contained in the polymer after 1 hour of a heat treatment at 150° C. and 0.13 Pa was $0.3 \times 10^{16}$ spins/g the g value was 2.0032, and the 400 nm absorbance of a solution containing 0.1 g of polymer after the heat treatment dissolved in 5 ml of dichloromethane was 0.01.

Comparative Example 8

The procedure of Example 22 was repeated except that polymerization was carried out using 0.007 part of di-n-butyltin diacetate in place of potassium carbonate at a final polymerization temperature of 320° C. and a pressure of about 66.7 Pa (about 0.5 mmHg) for 4 hours. The obtained polymer was dark yellow and transparent and had a reduced viscosity of 0.63 dl/g, a glass transition temperature of 190° C., a total radical amount of $1.5 \times 10^{17}$ spins/g and a g value of 2.0037. The total amount of radicals contained in the polymer after 1 hour of a heat treatment at 150° C. and 0.13 Pa was $5.6 \times 10^{16}$ spins/g, the g value of the radicals was 2.0032, and the 400 nm absorbance of a solution containing 0.1 g of the polymer after the heat treatment dissolved in 5 ml of dichloromethane was 0.15.

Comparative Example 9

The procedure of Example 22 was repeated except that polymerization was carried out using 0.07 part of di-n-butyltin diacetate in place of potassium carbonate at a final polymerization temperature of 320° C. and a pressure of about 0.5 mmHg for 1 hour and then agitation was carried out at the same temperature under normal pressure in a nitrogen atmosphere for 3 hours. The obtained polymer was dark yellow and transparent and had a reduced viscosity of 0.59 dl/g, a glass transition temperature of 189° C., a total radical amount of $1.2 \times 10^{17}$ spins/g and a g value of 2.0037. The total amount of radicals contained in the polymer after 1 hour of a heat treatment at 150° C. and 0.13 Pa was $5.1 \times 10^{16}$ spins/g, the g value of the radicals was 2.0032, and the 400 nm absorbance of a solution containing 0.1 g of the polymer after the heat treatment dissolved in 5 ml of dichloromethane was 0.13.

Comparative Example 10

The procedure of Example 22 was repeated except that polymerization was carried out using 0.007 part of di-n-butyltin diacetate in place of potassium carbonate at a final ultimate temperature of 320° C. and a pressure of about 66.7 Pa (about 0.5 mmHg) for 1 hour and then agitation was carried out at the same temperature under normal pressure in an air atmosphere for 3 hours. The obtained polymer was dark yellow and transparent and had a reduced viscosity of 0.43 dl/g, a glass transition temperature of 175° C., a total radical amount of $9.1 \times 10^{17}$ spins/g and a g value of 2.0041. The total amount of radicals contained in the polymer after 1 hour of a heat treatment at 150° C. and 0.13 Pa was $7.2 \times 10^{16}$ spins/g, the g value of the radicals was 2.0041, and the 400 nm absorbance of a solution containing 0.1 g of the polymer after the heat treatment dissolved in 5 ml of dichloromethane was 0.17.

Comparative Example 11

The procedure of Example 22 was repeated except that polymerization was carried out using 0.007 part of di-n-butyltin diacetate in place of potassium carbonate at a final polymerization temperature of 380° C. and a pressure of about 66.7 Pa (about 0.5 mmHg) for 2 hours. The obtained polymer was dark yellow and transparent and had a reduced viscosity of 0.72 dl/g, a glass transition temperature of 190° C., a total radical amount of $1.6 \times 10^{17}$ spins/g and a g value of 2.0037. The total amount of radicals contained in the polymer after 1 hour of a heat treatment at 150° C. and 0.13 Pa was $6.4 \times 10^{16}$ spins/g, the g value of the radicals was 2.0032, and the 400 nm absorbance of a solution containing 0.1 g of the polymer after the heat treatment dissolved in 5 ml of dichloromethane was 0.16.

What is claimed is:

1. A process for producing a wholly aromatic polyester comprising melt polycondensing by heating an aromatic dicarboxylic acid represented by the following formula (I):

$$\text{HOOC—A}^1\text{—COOH} \quad (I)$$

wherein $A^1$ is a substituted or unsubstituted divalent aromatic group having 6 to 20 carbon atoms, an aromatic diol represented by the following formula (II):

$$\text{HO—A}^2\text{—X—A}^3\text{—OH} \quad (II)$$

wherein $A^2$ and $A^3$ are each independently a substituted or unsubstituted phenylene group, and X is a group represented by the following formula:

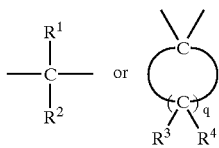

wherein $R^1$, $R^2$, $R^3$ and $R^4$ are each independently a hydrogen atom, halogen atom, alkyl group having 1 to 6 carbon atoms, cycloalkyl group having 5 to 6 carbon atoms, aryl group having 6 to 12 carbon atoms or aralkyl group having 7 to 12 carbon atoms, and q is an integer of 4 to 10, with the proviso that $R^3$'s and $R^4$'s may be the same or different, and a diaryl carbonate in the presence of at least one catalyst selected from the group consisting of (a) a combination of a pyridine compound represented by the following formula (III):

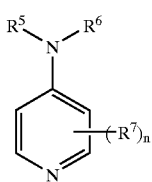 (III)

wherein $R^5$ and $R^6$ are each independently a hydrogen atom, alkyl group having 1 to 6 carbon atoms, cycloalkyl group having 5 to 10 carbon atoms, aryl group having 6 to 12 carbon atoms or aralkyl group having 7 to 12 carbon atoms, or $R^5$ and $R^6$ together with a nitrogen atom bonded thereto may be bonded together to form a 5- to 7-membered ring, $R^7$ is an alkyl group having 1 to 6 carbon atoms, cycloalkyl group having 5 to 10 carbon atoms, aryl group having 6 to 12 carbon atoms or aralkyl group having 7 to 12 carbon atoms, and n is an integer of 0 to 4, with the proviso that when n is an integer of 2 to 4, $R^7$'s may be the same or different, and an alkali metal carbonate or an alkali metal bicarbonate, (b) a combination of a pyridine compound represented by the above formula (III) and an organic tin compound represented by the following formula (IV):

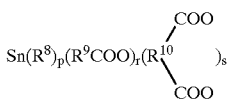 (IV)

wherein $R^8$ is an alkyl group having 1 to 20 carbon atoms, or unsubstituted or substituted aryl group having 6 to 20 carbon atoms, $R^9$ is an alkyl group having 1 to 20 carbon atoms, or unsubstituted or substituted aryl group having 6 to 20 carbon atoms, $R^{10}$ is a single bond, alkylene group having 1 to 10 carbon atoms, or unsubstituted or substituted arylene group having 6 to 20 carbon atoms, and p+r+2s=2 or 4, with the proviso that when p+r+2s=2, p=0 or 1, r=0, 1 or 2 and s=0 or 1, and when p+r+2s=4, p=0 to 3, r=0 to 4 and s=0 to 2, and (c) an organic titanium compound represented by the following formula (V):

$$Ti(OR^{11})_4 \quad (V)$$

wherein $R^{11}$ is an alkyl group having 1 to 6 carbon atoms, cycloalkyl group having 5 to 10 carbon atoms, aralkyl group having 7 to 12 carbon atoms or aryl group having 6 to 12 carbon atoms, with the proviso that $R^{11}$'s may be the same or different.

2. The process of claim 1, wherein the aromatic dicarboxylic acid, aromatic diol and diaryl carbonate are used in such amounts that satisfy the following expressions (1) and (2):

$$0.1 \leq A/B \leq 1.1 \quad (1)$$

$$0.8 \leq (A+B)/C \leq 1.2 \quad (2)$$

wherein A is the mols of the aromatic dicarboxylic acid, B is the mols of the aromatic diol and C is the mols of the diaryl carbonate.

3. The process of claim 1, wherein the aromatic dicarboxylic acid, aromatic diol and diaryl carbonate are used in such amounts that satisfy the following expressions (1)-1 and (2):

$$0.95 \leq A/B \leq 1.05 \quad (1)\text{-}1$$

$$0.8 \leq (A+B)/C \leq 1.2 \quad (2)$$

wherein A, B and C are as defined hereinabove, and a wholly aromatic polyester which contains a carbonate bond in an amount of no more than about 5% based on the total of the carbonate bond and ester bond is formed.

4. The process of claim 1, wherein the aromatic dicarboxylic acid, aromatic diol and diaryl carbonate are used in such amounts that satisfy the following expressions (1)-2 and (2):

$$0.1 \leq A/B \leq 0.95 \quad (1)\text{-}2$$

$$0.8 \leq (A+B)/C \leq 1.2 \quad (2)$$

wherein A, B and C are as defined hereinabove, and an aromatic polyester which contains a carbonate bond in an amount of about 5% or more based on the total of the carbonate bond and ester bond is formed.

5. The process of claim 1, wherein the pyridine compound represented by the above formula (III) is represented by the following formula (III)-1:

 (III)-1 wherein $R^{51}$ and $R^{61}$ are each independently a hydrogen atom or alkyl group having 1 to 6 carbon atoms, or $R^{51}$ and $R^{61}$ together with a nitrogen atom bonded thereto may be bonded together to form a 5- to 7-membered ring.

6. The process of claim 1, wherein the alkali metal of the alkali metal carbonate or the alkali metal bicarbonate is lithium, sodium or potassium.

7. The process of claim 1, wherein the organic tin compound represented by the above formula (IV) is represented by the following formula (IV)-1:

$$Sn(R^8)_u(R^9COO)_w \quad (IV)\text{-}1$$

wherein $R^8$ and $R^9$ are as defined hereinabove, and u+w=2 or 4, with the proviso that when u+w=2, u=0 or 1 and w=1 or 2, and when u+w=4, u is an integer of 0 to 3 and w is an integer of 1 to 4.

8. The process of claim 7, wherein $R^8$ and $R^9$ are both an alkyl group having 1 to 20 carbon atoms in the organic tin compound represented by the above formula (IV)-1.

9. The process of claim 1, wherein the organic titanium compound represented by the above formula (V) is a compound of the formula (V) in which at least one of $R^{11}$'s is an aryl group.

10. The process of claim 1 wherein a wholly aromatic polyester having a reduced viscosity (measured at 35° C. and 1.2 g/100 ml in a mixed solvent of phenol/1,1,2,2-tetrachloroethane in a weight ratio of 6/4) of 0.5 dl/g or more is formed.

11. The process of claim 1, wherein the final temperature of polycondensation is in the range of 260 to 400° C.

12. The process of claim 3, wherein the pyridine compound represented by the above formula (III) is represented by the following formula (III)-1:

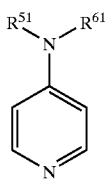

(III)-1 wherein $R^{51}$ and $R^{61}$ are each independently a hydrogen atom or alkyl group having 1 to 6 carbon atoms, or $R^{51}$ and $R^{61}$ together with a nitrogen atom bonded thereto may be bonded together to form a 5- to 7-membered ring, wherein the alkali metal of the alkali metal carbonate or the alkali metal bicarbonate is lithium, sodium or potassium.

13. The process of claim 3, wherein the pyridine compound represented by the above formula (III) is represented by the following formula (III)-1:

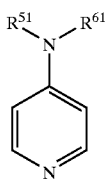

(III)-1 wherein $R^{51}$ and $R^{61}$ are each independently a hydrogen atom or alkyl group having 1 to 6 carbon atoms, or $R^{51}$ and $R^{61}$ together with a nitrogen atom bonded thereto may be bonded together to form a 5- to 7-membered ring, wherein the alkali metal of the alkali metal carbonate or the alkali metal bicarbonate is lithium, sodium or potassium;

wherein a wholly aromatic polyester having a reduced viscosity (measured at 35° C. and 1.2 g/100 ml in a mixed solvent of phenol/1,2,2,2-tetrachloroethane in a weight ratio of 6/4) of 0.5 dl/g or more is formed.

14. The process of claim 3, wherein the pyridine compound represented by the above formula (III) is represented by the following formula (III)-1:

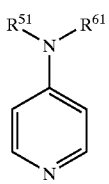

(III)-1 wherein $R^{51}$ and $R^{61}$ are each independently a hydrogen atom or alkyl group having 1 to 6 carbon atoms, or $R^{51}$ and $R^{61}$ together with a nitrogen atom bonded thereto may be bonded together to form a 5- to 7-membered ring, wherein the alkali metal of the alkali metal carbonate or the alkali metal bicarbonate is lithium, sodium or potassium;

wherein a wholly aromatic polyester having a reduced viscosity (measured at 35° C. and 1.2 g/100 ml in a mixed solvent of phenol/1,2,2,2-tetrachloroethane in a weight ratio of 6/4) of 0.5 dl/g or more is formed;

wherein the final temperature of polycondensation is in the range of 260 to 400° C.

15. A wholly aromatic polyester which contains a recurring unit represented by the following formula (A):

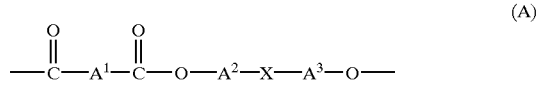

(A)

wherein $A^1$ is a substituted or unsubstituted divalent aromatic group having 6 to 20 carbon atoms, $A^2$ and $A^3$ are each independently a substituted or unsubstituted phenylene group, and X is a group represented by the following formula:

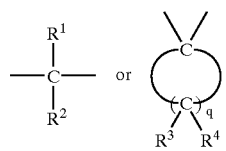

wherein $R^1$, $R^2$, $R^3$ and $R^4$ each independently a hydrogen atom, halogen atom, alkyl group having 1 to 6 carbon atoms, cycloalkyl group having 5 to 6 carbon atoms, aryl group having 6 to 12 carbon atoms or aralkyl group having 7 to 12 carbon atoms, and q is an integer of 4 to 10, with the proviso that $R^3$'s and $R^4$'s may be the same or different, and which has a haze value of 15 or less when it is molded into a 2 mm thick plate and an increase in haze value of 50 or less when the molded plate is immersed in water heated at 120° C. for 100 hours.

16. The wholly aromatic polyester of claim 15 which contains a carbonate bond in an amount of no more than 5% based on the total of the carbonate bond and ester bond.

17. The wholly aromatic polyester of claim 15 which contains a carbonate bond in an amount of about 5% or more based on the total of the carbonate bond and ester bond.

18. A wholly aromatic polyester which contains a recurring unit represented by the following formula (A) and a radical having a g value in the electronic spin resonance spectrum after 60 minutes of a heat treatment at 150° C. and 0.13 Pa of 2.0032±0.0001 in an amount of $5.0 \times 10^{16}$ spins/g or less:

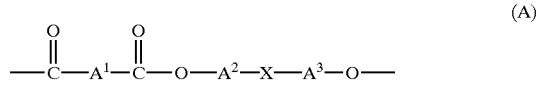

(A)

wherein $A^1$ is a substituted or unsubstituted divalent aromatic group having 6 to 20 carbon atoms, $A^2$ and $A^3$ are each independently a substituted or unsubstituted phenylene group, and X is a group represented by the following formula:

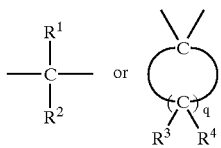

wherein $R^1$, $R^2$, $R^3$ and $R^4$ are each independently a hydrogen atom, halogen atom, alkyl group having 1 to 6 carbon atoms, cycloalkyl group having 5 to 6 carbon atoms, aryl group having 6 to 12 carbon atoms or aralkyl group having 7 to 12 carbon atoms, and q is an integer of 4 to 10, with the proviso that $R^3$'s and $R^4$'s may be the same or different.

19. The wholly aromatic polyester of claim 18 which contains at least one radical having a g value of 2.0031 to 2.0037 in the electronic spin resonance spectrum before the above heat treatment in an amount of $1.0 \times 10^{17}$ spins/g or less.

20. The wholly aromatic polyester of claim 18, wherein a solution containing 0.1 g of the polyester dissolved in 5 ml of dichloromethane shows an absorbance at a wavelength of 400 nm of 0.1 or less after 60 minutes of a heat treatment at 150° C. and 0.13 Pa.

21. The wholly aromatic polyester of claim 18 which contains a carbonate bond in an amount of no more than 5% based on the total of the carbonate bond and ester bond.

22. The wholly aromatic polyester of claim 19 or 20 which contains a carbonate bond in an amount of no more than 5% based on the total of the carbonate bond and ester bond.

23. The wholly aromatic polyester of claim 18 which contains a carbonate bond in an amount of about 5% or more based on the total of the carbonate bond and ester bond.

24. The wholly aromatic polyester of claim 19, wherein a solution containing 0.1 g of the polyester dissolved in 5 ml of dichloromethane shows an absorbance at a wavelength of 400 nm of 0.1 or less after 60 minutes of a heat treatment at 150° C. and 0.13 Pa.

25. The wholly aromatic polyester of claim 19, wherein a solution containing 0.1 g of the polyester dissolved in 5 ml of dichloromethane shows an absorbance at a wavelength of 400 nm of 0.1 or less after 60 minutes of a heat treatment at 150° C. and 0.13 Pa, wherein the polyester contains a carbonate bond in an amount of no more than 5% based on the total of the carbonate bond and ester bond.

\* \* \* \* \*